June 23, 1942.  F. HODSON ET AL  2,287,476

APPARATUS FOR REDUCING ORE

Original Filed Oct. 6, 1937  2 Sheets-Sheet 1

INVENTORS
Frank Hodson
BY Paul A. Hirsch
Arquet, Meauys Campbell
ATTORNEYS

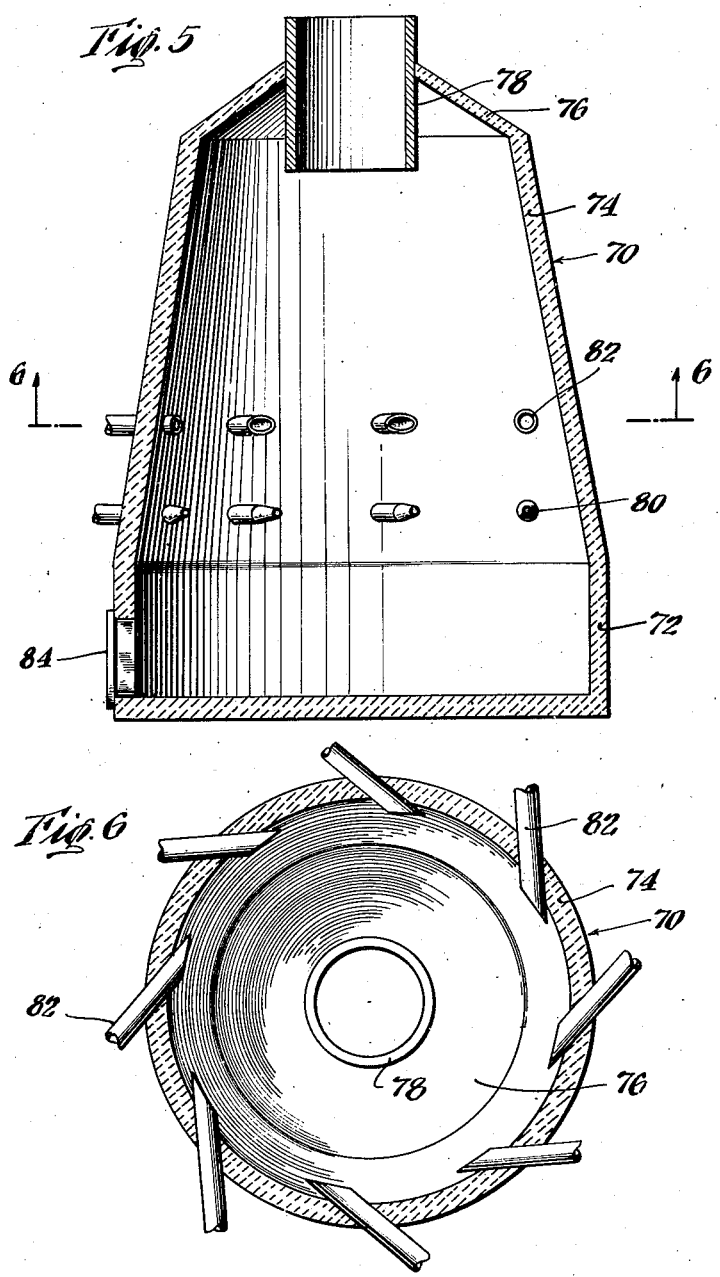

Patented June 23, 1942

2,287,476

UNITED STATES PATENT OFFICE 2,287,476

APPARATUS FOR REDUCING ORE

Frank Hodson, Elmhurst, and Paul A. Hirsch, New York, N. Y., assignors to American Ore Reduction Corporation, New York, N. Y., a corporation of Delaware Original application October 6, 1937, Serial No. 167,542. Divided and this application December 22, 1939, Serial No. 310,548

11 Claims. (Cl. 266—24)

This invention relates to apparatuses for beneficiating or enriching the metallic content of ores and particularly relates to improvements in reducing furnaces.

This is a division of our application, Serial No. 167,542 filed October 6, 1937, now Patent No. 2,184,300, issued December 26, 1939.

The standard methods of reducing ores, such as, for example, iron ores, require the use of iron ore in lumpy form, because otherwise there is a considerable loss of iron ore as dust in the operation. Moreover, powdered ores cannot be used in this type of reducing operation because they tend to accumulate on the walls of the furnace shaft and clog up the inside of the furnace.

The fact that powdered or finely divided ores cannot be used directly in the usual type of blast furnace prevents the use of certain types of ores which are unobtainable in lump form with a sufficiently high iron or iron oxide content to render their reduction commercially practical. Some forms of magnetite ores, for example, are found mixed with rock, and must be crushed to a very fine state to allow magnetic separation of the ore from the rock to produce a concentrated ore. Other forms of magnetite ore are found in sandy formations, in a finely divided form and are easily concentrated to high iron content by magnetic separation.

Ores of these types cannot be used in the ordinary blast furnace without first agglomerating them or forming them into chunks or lumps of suitable size. This lumping step increases the cost of producing the iron and as a result has rendered the production of iron from these ores unprofitable.

An object of this invention is to provide apparatuses which render the production of iron, steel and steel alloys from finely divided ores commercially practical.

A further object of the invention is to provide apparatuses for treating finely divided ores to produce finely divided metals of a high degree of purity.

The apparatus hereinafter more particularly described embodying our invention may be applied to the beneficiation and/or reduction of all types of ores, and is particularly adapted to the treatment of iron ore or other iron-bearing materials. It is particularly suitable for handling magnetite ores and also other forms of iron oxides, iron carbonates, and compounds of iron and sulphur.

The apparatus for carrying forward our process is constructed to cause injection of the fuel and the air in such a way as to produce a great turbulence in the interior of the furnace shaft. In one form of apparatus the fuel and air-injecting nozzles are directed substantially tangentially to the periphery of the furnace shaft, and thereby create a gyrating column of flame directed upwardly of the furnace shaft. This flame causes rapid movement of the particles of ore therein, and also maintains them in suspension until their reduction to metal is achieved after which the particles can be thrown out centrifugally or allowed to settle out and be deposited on the floor of the furnace chamber. It will be understood that the fuel injectors and ore injectors can be arranged in any desired way to produce a turbulent column of flame and gas of sufficient velocity to suspend the ore in the furnace shaft until the ore is reduced to metal. Also, the turbulence may be controlled by the use of baffles in the furnace shaft. Helical baffles may be used to maintain a spiralling flow of gas and flame, if desired.

If desired, the furnace chamber can be tapered upwardly to create a swirling action of gradually increasing velocity whereby the particles, which are carried upwardly by the flow of gases, will ultimately be thrown out. Suitable separating mechanisms can be used to remove the metallic particles from the zone of turbulence and to eliminate dust losses.

If desired, the ore charge with the reducing agent, which may be hydrogen or hydrocarbon gases, carbon or coke, or other carbonaceous material in liquid, gaseous, powdered or colloidal form, may also be blown into the interior of the furnace through suitable discharge nozzles. These nozzles may be directed substantially radially or non-radially into the furnace shaft and may be directed either in the same direction as the fuel injecting nozzles, or in a counter direction.

It will be understood that any desired type of fuel may be used for heating the furnace shaft and for creating the reducing gases, but we prefer to use fuels such as finely divided carbon, coal, or coke, oil, carbon monoxide, hydrocarbon gas, or hydrogen.

For a better understanding of the present invention, reference may be had to the accompanying drawings in which:

Figure 5 is a view in vertical section of another modified form of furnace shaft embodying the invention; and Figure 6 is a sectional view taken on the line 6—6 of Figure 5.

Figure 1:
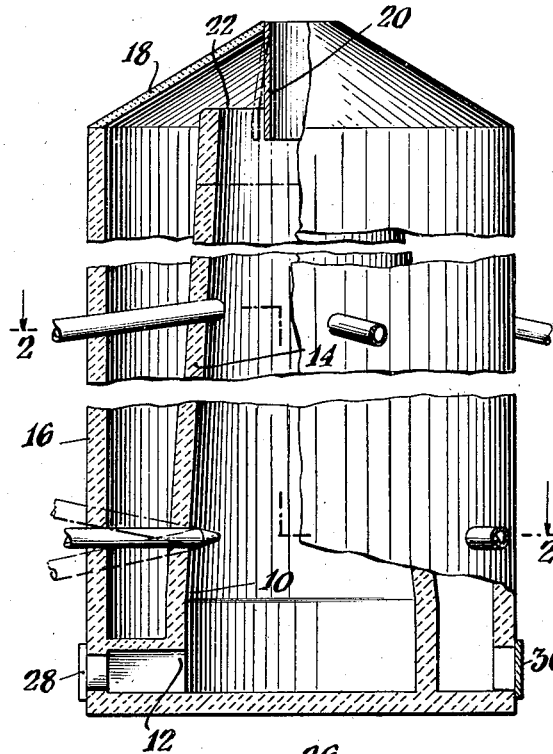
Figure 1 is a side elevation of a furnace shaft, partly broken away and partly in section, embodying the present invention.
Figure 2:
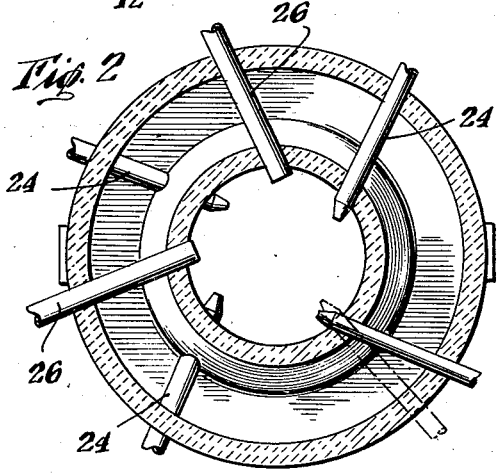
Figure 2 is a sectional view of the furnace shaft taken on the line 2—2 of Figure 1.

In the form of the invention illustrated in Figures 1 and 2, the blast furnace may consist of a furnace shaft 10 having a lower cylindrical portion 12 and an upper converging frusto-conical portion 14. The furnace shaft 10 is enclosed in an outer wall 16 of cylindrical shape, which is spaced from the furnace shaft 14 to produce an annular space for receiving part of the reduced metal thrown out by centrifugal action of the swirling column of flame and gas in the furnace shaft. Some of the metal may settle out in the furnace shaft 10. The furnace shaft is closed by means of a conical or frusto-conical top 18, carried by the wall 16 at its upper end. In the central portion of the top is mounted a downwardly extending exhaust flue 20, through which pass the products of combustion of the fuel and the exhaust gases produced in the reducing action. The flue 20 preferably has its lower edge disposed below the top of the furnace shaft 10, whereby a skimming slot 22 is provided for separating the metallic particles from the column of gas and flame. The flue 20 may be connected to a dust collector (not shown), of any desired type, to receive and recover ore dust and any metallic particles which are entrained and carried out of the furnace shaft by the rising column of gases.

Fuel and air are fed into the furnace shaft 10 through a plurality of nozzles 24, which pass through the walls 14 and 16 and have their ends disposed within the furnace shaft. As best shown in Figure 2, the fuel-injecting nozzles 24 are arranged non-radially of the furnace shaft and all directed in the same direction whereby, upon injection of the fuel and air, a rotating column of gas and flame is produced extending vertically of the furnace shaft. The nozzles 24 may be directed parallel to the bottom of the furnace shaft, as shown in full lines in Figure 1, or they may be inclined to the horizontal, as shown in dotted lines in Figure 1. Likewise, the angle at which the fuel-injecting nozzles 24 are inclined to the diameter of the shaft may be varied between substantially radially of, as shown in dotted lines, and substantially tangentially to the furnace shaft, as shown in full lines in Fig. 2.

Finely divided ore, reducing agents, such as powdered coal, coke or carbon, and fluxing materials may be fed into the furnace through the charge-injecting nozzles 26, which are located above the fuel-injecting nozzles 24. The charge-injecting nozzles may be non-radially or radially disposed in the furnace shaft to blow the charge into the rotating or turbulent column of flame and gases. The inclination of the charge-injecting nozzles 26 may be varied both with respect to the radius of the shaft and with respect to the horizontal, as desired. Likewise, the ore-injecting nozzles may be disposed below the fuel-injecting nozzles to direct the ore upwardly into the column of flame, or the ore may be charged from the top of the furnace shaft and allowed to fall into the column of flame. The number of nozzles 24 and 26 may be varied.

Any desired type of blower may be used for injecting the fuel and air and the charge into the interior of the furnace shaft. Many such blowers for finely divided or pulverized fuels are known in the market and it is therefore believed unnecessary to include a description of the same.

The furnace shaft 10 and the outer wall 16 of the furnace may be provided with clean-out doors 28 and 30, respectively, for removing the reduced metal and the accumulated ash or solid residue produced by the combustion of the fuel and reduction of the metallic ore.

In operation, fuel and air are injected through the nozzles 24, ignited and the furnace shaft brought up to the desired temperature. Finely divided ore and reducing agents are then blown through nozzles 26 into the column of flame produced by combustion of the fuel, and the particles of ore are whirled in the column of flame and blown upwardly with great turbulence, thereby contacting their entire surface portions with the reducing gases created by partial combustion of the fuel. On their turbulent course, the particles rub against each other in the column of flame, removing the skin of carbon dioxide which is formed during the reducing action, and allowing the reduction to penetrate rapidly into the center of the finely divided particles of ore. The rising column of gases and flame lift the particles upwardly and spin them at increasing angular velocity, due to the decreasing cross-sectional area of the furnace shaft. The centrifugal force exerted on the particles of reduced ore forces them to the outer edge of the rising and spinning column of flame and gases where some of the particles are skimmed out by the skimming slot 22 and gradually settle into the annular space between the furnace shaft 10 and the outer wall 16 of the furnace from where they may be withdrawn through the clean-out doors 28. A portion of the remainder may settle out in the shaft 10. The carbon dioxide generated by combination of the carbon monoxide produced by combustion of the fuel with air and the oxygen separated from the ore passes out through the flue 20.

The gaseous products of combustion and reaction and entrained metallic powder or dust will pass to the separator where the dust is removed. The collected material may, if desired, be subjected to a magnetic separation operation and the metallic particles mixed with the other reduced metal.

Figure 3:
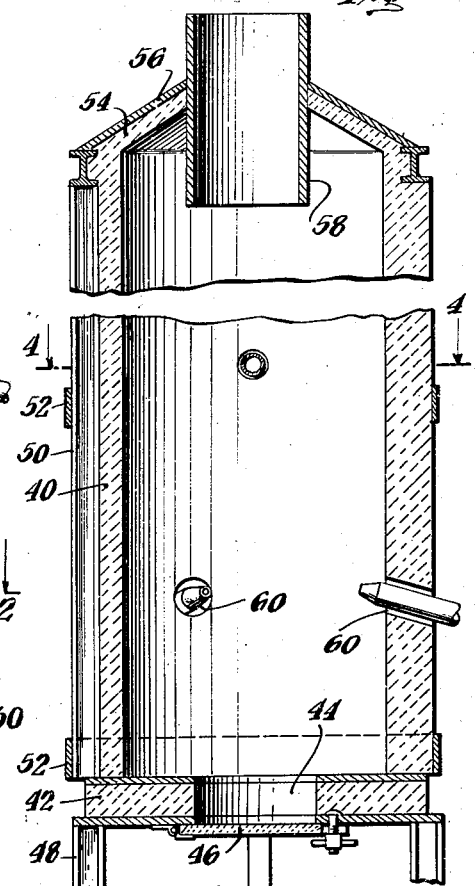
Figure 3 is a view in vertical section of a modified form of furnace shaft embodying the invention.
Figure 4:
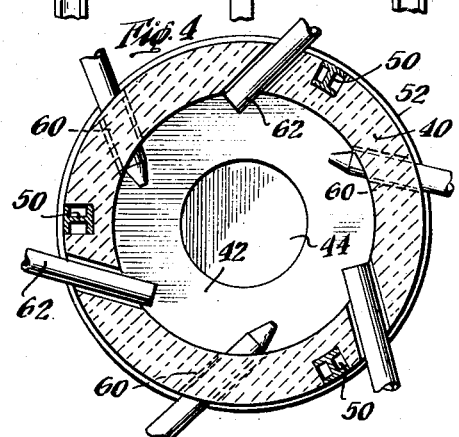
Figure 4 is a sectional view taken on the line 4—4 of Figure 3.

In Figures 3 and 4 another form of blast furnace is illustrated. This type of blast furnace may consist of a furnace shaft 40 of generally cylindrical shape supported on a base 42, which is provided with a clean-out opening 44. The clean-out opening may be provided with hinged covers 46 through which the reduced metal and other non-metallic materials, such as ash, may be removed. The shaft 40 is preferably mounted with the base 42 spaced from the floor a sufficient distance that trucks for receiving the reduced metal may be run thereunder. The spaced or elevated relationship of the furnace shaft may be produced by mounting the entire structure upon a plurality of girders 48, which are set with their lower ends embedded in a concrete base.

The furnace shaft 40 may be made of fire brick, refractory material or heat resisting alloys of any desired type and may be braced longitudinally by means of girders 50 extending the length of the furnace shaft. The shaft 40 may also be braced against lateral stresses by means of encircling steel bands 52 spaced apart along the length of the shaft 40, as required. The top of the shaft 40 is closed by a conical cover 54 integral therewith, which may be rigidified and strengthened by means of a conical or frusto-conical steel plate 56.

Extending down through the center of the conical cap 54 is an exhaust tube 58 which terminates within the interior of the furnace shaft 40. The exhaust tube 58 may be made of any suitable refractory material and is preferably connected to a dust collector, not shown, of any suitable type, such as a cyclone or electrostatic separator.

As best shown in Figure 4, the furnace shaft 40 may be provided with a plurality of burner openings 60, which open non-radially or radially into the center of the shaft 40. The inclination of the burner openings may be varied in the manner set forth in the description of Figures 1 and 2. The shaft 40 is also provided with a plurality of ore or charge inlets 62 which, as illustrated in Figure 4, are directed non-radially of the furnace shaft 40. The ore inlets 62 may be likewise varied with respect to their inclination to the horizontal and radially of the furnace shaft in the manner set forth in the description of the similar ore inlets disclosed in Figures 1 and 2.

In operation, the fuel is injected through the burner openings 60 in admixture with a sufficient quantity of air to support combustion and the furnace shaft 40 brought up to temperature. Combustion of the fuel produces carbon monoxide gas and a column of flame and other gases, which have sufficient velocity to suspend a continuously fed charge of ore in a pulverulent state and a reducing agent, such as powdered coke or coal. The charge is fed through the ore inlets 62 and, upon contact with the turbulent column of flame and reducing gases, is lifted upwardly through the furnace shaft and subjected to centrifugal force.

Owing to the fact that the exhaust tube 58 is materially smaller in size than the furnace shaft 40, the greater volume of the gases must change direction to converge into exhaust tube 58, and this change of direction, coupled with centrifugal force, causes much of the reduced metal to be thrown against the shaft wall instead of following the gases through the tube 58, so that the metal settles from the relatively quiet zone between the depending tube 58 and the wall of the shaft 40 to the bottom shaft. The collected particles of metal, ash and other impurities may be drawn out through the clean-out door 44 and subjected to a separation treatment to remove the purified metal. It will be understood that the temperature of the furnace shaft may be regulated by the quantity of fuel fed thereinto, and, if desired, a sufficiently high temperature may be used to reduce the ore and produce the metal in a molten state. It will likewise be understood that alloying ingredients and fluxes may be injected with the ore charge and a molten alloy produced.

In Figs. 5 and 6 is disclosed another type of reducing furnace, consisting of a furnace shaft 70 consisting of a lower cylindrical portion 72 and an upper conical or frusto-conical portion 74 which is closed by a frusto-conical cover or top 76. The top 76 is provided with an exhaust flue 78 through which the gases may escape to a separator (not shown). The furnace shaft 70 may be provided with fuel-injecting nozzles 80 and charge-injecting nozzles 82 arranged in substantially the same way as the corresponding parts of the furnaces disclosed in Figures 1 to 4. The shaft 70 is also provided with one or more clean-out doors 84 through which the metal and residues may be removed.

By way of specific example of the operation of the furnaces, finely divided iron may be produced by injecting a pulverized magnetite ore, which is of sufficient fineness that 70 to 80% will pass through a 200 mesh sieve. This finely divided ore is mixed with powdered coal of a like fineness, that is, so finely divided that 70 to 80% of the coal will pass through a 200 mesh sieve. Coal of like fineness is used as fuel.

When using a furnace shaft 30 feet long and having an inside diameter of about 8 feet, a blast velocity of between 4,000 and 6,000 feet per minute (cold gas measurement) produces a satisfactory suspension of the ore and will allow the metallic particles produced by reduction in the flame to settle out.

It will be understood that the blast volume or rate will be varied, depending upon the size of furnace shaft used, and likewise must be varied if ore of different particle size and specific gravity is used. Each of these conditions of blast rate, specific gravity, particle size and diameter and size of furnace shaft may be determined by a simple experiment to produce the desired suspension and separation of the reduced metal. For furnace shafts of average size it ordinarily will be unnecessary to use a blast velocity in excess of 10,000 feet per minute.

The particle size, while preferably on the order of that set forth in the above specific example, may be increased or decreased.

A suspension of the ore in oil in which the ore particles may be as small as colloidal size, either with or without other reducing agents of similar particle size, may be used to great advantage. The colloidal size of the particles renders reduction under proper conditions substantially instantaneous. Also, the liquid state of the charge greatly facilitates its injection into the furnace shaft. By properly proportioning the oil and ore, the charge may also serve as the fuel, allowing the elimination of additional sources of flame and reducing gases.

It will be understood from the foregoing that we have produced apparatuses which are particularly adapted to handle finely divided ores of all types which were hitherto impractical to use in the ordinary type of blast furnace.

The term "ore," used in the specification, and the claims, is intended to include natural metal-bearing ores and metallic residues, such as oxidized scrap, iron rust and similar materials, which include metallic oxides.

The term "beneficiation" is intended to cover the treatment of low grade ores, particularly iron ores, to enrich their metallic content either to render them susceptible to further reduction in conventional apparatuses such as, for example, blast furnaces, or to reduce the ore completely to metal.

It likewise will be understood that the apparatus described herein may be of varied size and proportions and that the shape may be altered as desired, so long as it is of sufficient length and shape to promote the formation of a violently turbulent column of flame and gases

We claim:

1. A furnace for reducing ore to metal comprising an inner shaft, an outer shaft substantially concentric with, in spaced relation to and defining with said inner shaft a settling chamber, an end closure for said outer shaft spaced from an adjacent end of said inner shaft, an annular member depending from said closure into said inner shaft and defining therewith a separating slot communicating with said settling chamber, means for injecting ore into said inner shaft and means for maintaining in said inner shaft a gyrating column of reducing gases for entraining and reducing said ore to metal, and directing at least a portion of said reduced metal through said separating slot by centrifugal force.

2. The furnace set forth in the preceding claim in which the means for injecting ore into said shaft comprise a plurality of nozzles and the means for maintaining the gyrating column of gases comprise a plurality of similarly non-radially inclined nozzles.

3. The furnace set forth in claim 1 in which the inner shaft includes an upper frusto-conical portion whereby the angular velocity of the gyrating column of gases is increased and greater centrifugal force is exerted on the reduced metal entrained in said gases.

4. In a furnace for reducing ores, the combination of a vertical enclosure, a furnace shaft spaced inwardly of and terminating short of the top of the enclosure to provide an annular settling chamber communicating with the furnace shaft, means for injecting carbonaceous fuel and combustion supporting gas into the furnace shaft, means for injecting finely divided ore into the furnace shaft, and means depending from the top of the enclosure in axial alignment with and of lesser transverse dimensions than the furnace shaft for allowing escape of the gases and forming with the furnace shaft a separating slot communicating with the settling chamber.

5. The furnace set forth in claim 4 in which the fuel and ore-injecting means are non-radially inclined with respect to the furnace shaft.

6. In a furnace for reducing ores, the combination of a furnace shaft, the combination of an outer wall substantially concentric with and spaced from said shaft, an exhaust flue at one end of said shaft and communicating therewith, means extending into said shaft for introducing finely divided ore into said shaft, and means for introducing reducing agent into said shaft to entrain and convey said ore along said shaft toward said flue until said ore is reduced to metal.

7. In a furnace for reducing ores, the combination of a furnace shaft, a plurality of substantially radial nozzles spaced circumferentially around said shaft and directed diagonally toward the axis thereof for introducing a plurality of converging streams of reducing agent into said shaft to create and maintain a violently turbulent and heated column of reducing gases flowing along the axis of said shaft, a plurality of inwardly directed nozzles spaced circumferentially about said shaft above the first mentioned nozzles for introducing such finely divided ore into said column that the ore will be entrained in said column and reduced to metal, and means for separating the reduced metal from the gases.

8. In a furnace for reducing ore to metal, the combination of a shaft, an exhaust tube of smaller diameter than the diameter of the shaft extending into one end of the shaft and forming an annular space with the wall of the shaft, means for injecting ore in finely divided form into said shaft, and a plurality of upwardly and inwardly directed nozzles spaced circumferentially around said shaft for introducing a plurality of converging streams of reducing agent into said shaft for creating and maintaining in said shaft a turbulent column of reducing gases at reducing temperature for entraining said ore and reducing it to metal, said gases being discharged through said exhaust tube and the reduced metal being largely separated therefrom in said annular space by change of direction of the discharging gases.

9. In a furnace for reducing ore to metal, the combination of a shaft, an exhaust tube of smaller diameter than the diameter of the shaft extending into one end of the shaft and forming an annular space with the wall of the shaft, nozzle means for injecting ore in finely divided form into said shaft, and a plurality of circumferentially spaced additional nozzles directed inwardly and upwardly into said shaft for introducing converging and intersecting streams of reducing agent for creating and maintaining in said shaft a gyrating column of reducing gases at reducing temperature for entraining said ore and reducing it to metal, said gases being discharged through said exhaust tube and the reduced metal being largely separated therefrom in said annular space by change of direction of the discharging gases.

10. In a furnace for reducing ore to metal, the combination of a vertical shaft, an exhaust tube therefor, a cylindrical wall of larger diameter than the diameter of the shaft forming an annular space with the wall of the shaft communicating with the upper end of the shaft, means for injecting ore in finely divided form into said shaft, and means for maintaining in said shaft a gyrating upwardly-flowing column of reducing gases at reducing temperature for entraining said ore and reducing it to metal, said gases being discharged upwardly through said exhaust tube and the reduced metal being largely separated therefrom in said annular space by centrifugal force and change of direction of the discharging gases.

11. In a furnace for reducing ores, the combination of a furnace shaft, an outer wall substantially concentric with and spaced from said shaft, said shaft communicating at its upper end with the annular space so formed around said shaft, an exhaust flue communicating with the upper end of said shaft, means extending into said shaft for introducing finely-divided ore into said shaft, means for introducing reducing agent into said shaft to entrain and convey said ore along said shaft in a turbulent column toward the upper end thereof until said ore is reduced to metal, and means at the upper end of said shaft for deflecting the reduced metal into said annular space, the gaseous products discharging through said flue.

FRANK HODSON.
PAUL A. HIRSCH.